(12) United States Patent
Sato et al.

(10) Patent No.: US 11,865,829 B2
(45) Date of Patent: Jan. 9, 2024

(54) FUNCTIONAL ELEMENT AND METHOD OF MANUFACTURING FUNCTIONAL ELEMENT, AND ELECTRONIC APPARATUS

(71) Applicants: SONY CORPORATION, Tokyo (JP); TOHOKU UNIVERSITY, Miyagi (JP)

(72) Inventors: Yoshihisa Sato, Saitama (JP); Gen Yonezawa, Kanagawa (JP); Shohei Abe, Shizuoka (JP); Yuichi Takahashi, Kanagawa (JP); Takehito Shimatsu, Miyagi (JP); Miyuki Uomoto, Miyagi (JP)

(73) Assignees: SONY CORPORATION, Tokyo (JP); TOHOKU UNIVERSITY, Miyagi (JP)

( * ) Notice: Subject to any disclaimer, the term of this patent is extended or adjusted under 35 U.S.C. 154(b) by 135 days.

(21) Appl. No.: 16/960,309

(22) PCT Filed: Dec. 26, 2018

(86) PCT No.: PCT/JP2018/047791
§ 371 (c)(1),
(2) Date: Jul. 6, 2020

(87) PCT Pub. No.: WO2019/138875
PCT Pub. Date: Jul. 18, 2019

(65) Prior Publication Data
US 2020/0369000 A1    Nov. 26, 2020

(30) Foreign Application Priority Data

Jan. 15, 2018 (JP) .................... 2018-004115

(51) Int. Cl.
*B32B 7/04* (2019.01)
*B23K 20/233* (2006.01)
(Continued)

(52) U.S. Cl.
CPC .............. *B32B 7/04* (2013.01); *B23K 20/233* (2013.01); *C03C 27/02* (2013.01); *C03C 27/08* (2013.01); *Y10T 428/12597* (2015.01)

(58) Field of Classification Search
None
See application file for complete search history.

(56) References Cited

U.S. PATENT DOCUMENTS 6,197,139 B1    3/2001  Ju
6,199,748 B1 *  3/2001  Zhu ...................... B23K 20/023
                                                     228/234.1
(Continued)

FOREIGN PATENT DOCUMENTS

CN    102867847 A     1/2013
CN    103339688 A    10/2013
(Continued)

OTHER PUBLICATIONS

Shimatsu et al., "Atomic diffusion bonding of wafers with thin nanocrystalline metal films", Jun. 28, 2010, J. Vac. Sci. Tech., B 28(4), pp. 706-714. (Year: 2010).*

(Continued)

*Primary Examiner* — Xiaobei Wang
(74) *Attorney, Agent, or Firm* — CHIP LAW GROUP

(57) ABSTRACT

There is provided a functional element that includes a first substrate, a second substrate disposed to face the first substrate, and a buffer layer provided between the first substrate and the second substrate. The buffer layer has, in a layer thereof, a distribution of concentration of a metallic element. The distribution changes in a film thickness direction.

16 Claims, 9 Drawing Sheets

(51) Int. Cl.
*C03C 27/08* (2006.01)
*C03C 27/02* (2006.01)

(56) References Cited

U.S. PATENT DOCUMENTS

| | | | |
|---|---|---|---|
| 2010/0288995 | A1 | 11/2010 | Ozawa et al. |
| 2010/0304175 | A1* | 12/2010 | Kilmer .................... C22C 21/16 428/576 |
| 2014/0083597 | A1* | 3/2014 | Kalkowski .............. B32B 37/14 156/308.2 |
| 2014/0312359 | A1* | 10/2014 | Pham .................... H01L 33/005 257/782 |
| 2017/0236800 | A1* | 8/2017 | Gondcharton .......... H01L 24/32 438/458 |
| 2018/0297143 | A1* | 10/2018 | Imbert ................. H01L 21/187 |

FOREIGN PATENT DOCUMENTS

| | | | |
|---|---|---|---|
| CN | 103424984 | A | 12/2013 |
| CN | 105189109 | A | 12/2015 |
| CN | 107148676 | A | 9/2017 |
| CN | 107534033 | A | 1/2018 |
| JP | 63-049382 | A | 3/1988 |
| JP | 63-315578 | A | 12/1988 |
| JP | 2000-101188 | A | 4/2000 |
| JP | 2010-046696 | A | 3/2010 |
| JP | 2013-033786 | A | 2/2013 |
| JP | 2014-523632 | A | 9/2014 |
| JP | 2016087664 | A | 5/2016 |
| JP | 2017536986 | A | 12/2017 |
| WO | 2012/113787 | A1 | 8/2012 |
| WO | 2012/154589 | A1 | 11/2012 |

OTHER PUBLICATIONS

International Search Report and Written Opinion of PCT Application No. PCT/JP2018/047791, dated Apr. 2, 2019, 09 pages of ISRWO.
Office Action for CN Patent Application No. 201880085845.1, dated Apr. 8, 2022, 10 pages of Office Action and 09 pages of English Translation.
Office Action for JP Patent Application No. 2019-564620, dated Jul. 5, 2022, 04 pages of English Translation and 05 pages of Office Action.
Database WPI, Week 298906, Thomson Scientific, AN 1989-043204.
Database WPI, Week 1988815, Thomson Scientific, AN 1988-100765.

* cited by examiner

[ FIG. 1 ]
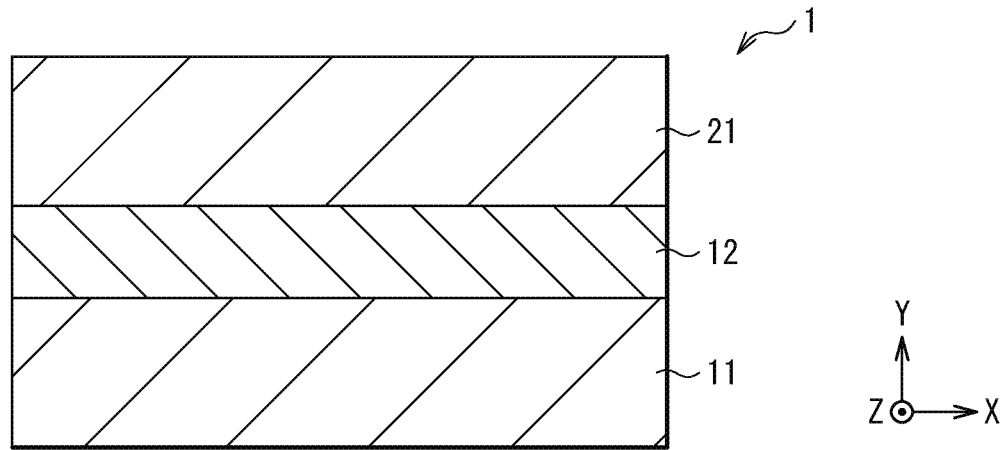
[ FIG. 2 ]
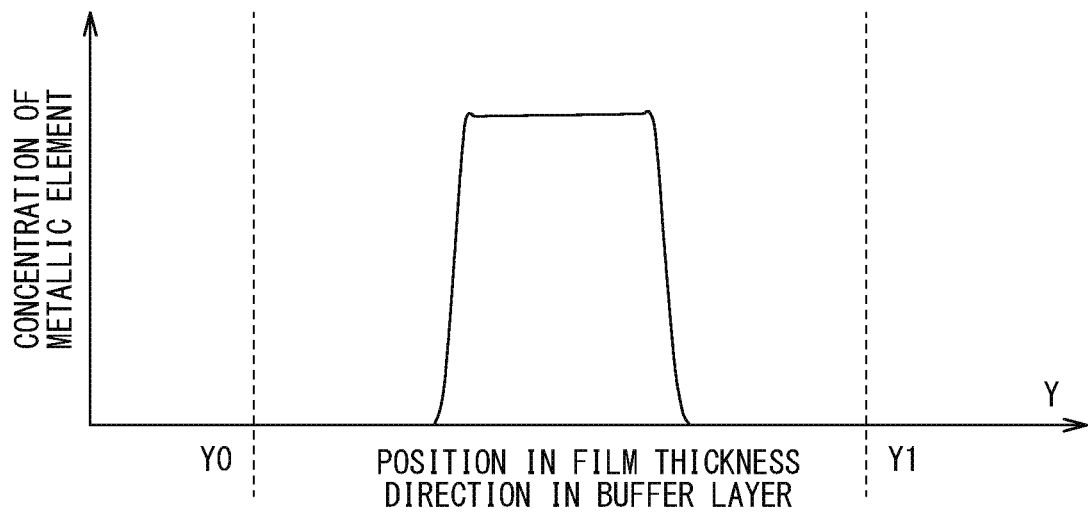
[ FIG. 3 ]
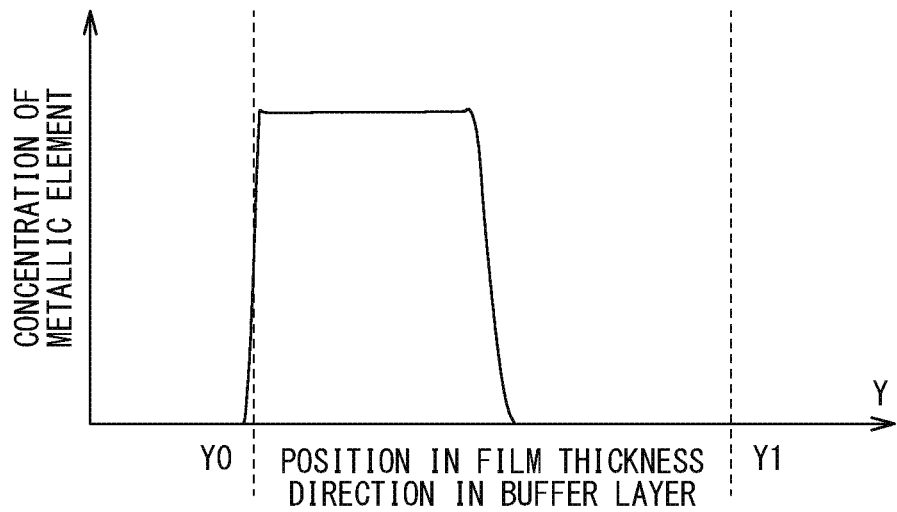

[ FIG. 4A ]
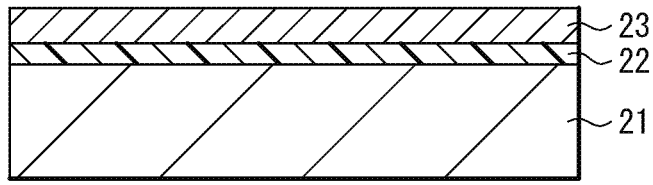
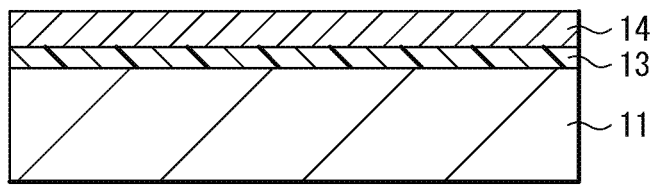
[ FIG. 4B ]
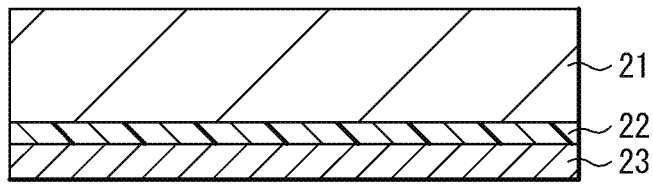
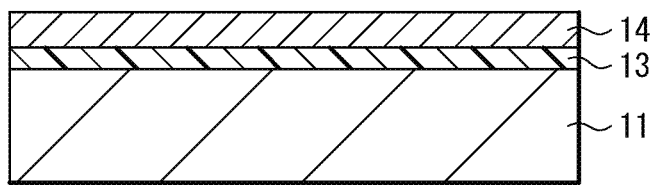
[ FIG. 4C ]
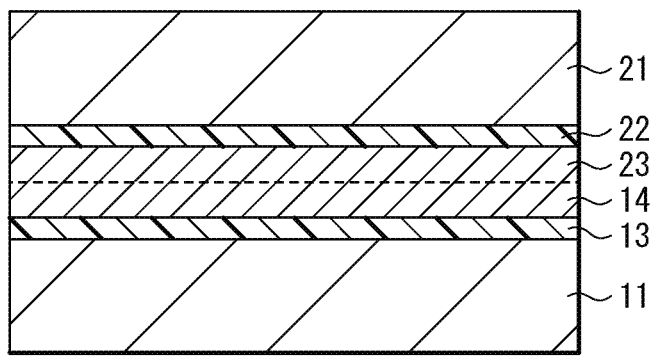

[ FIG. 5A ]
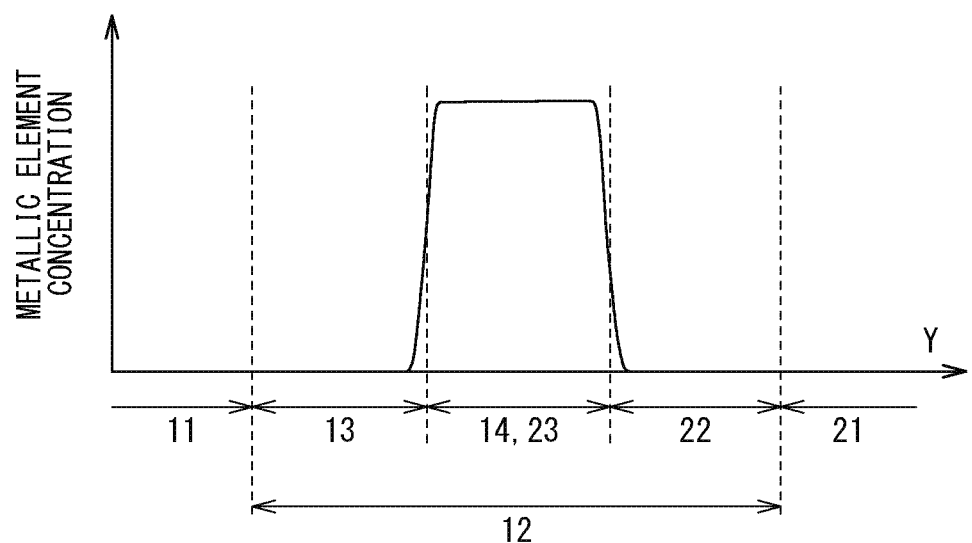
[ FIG. 5B ]
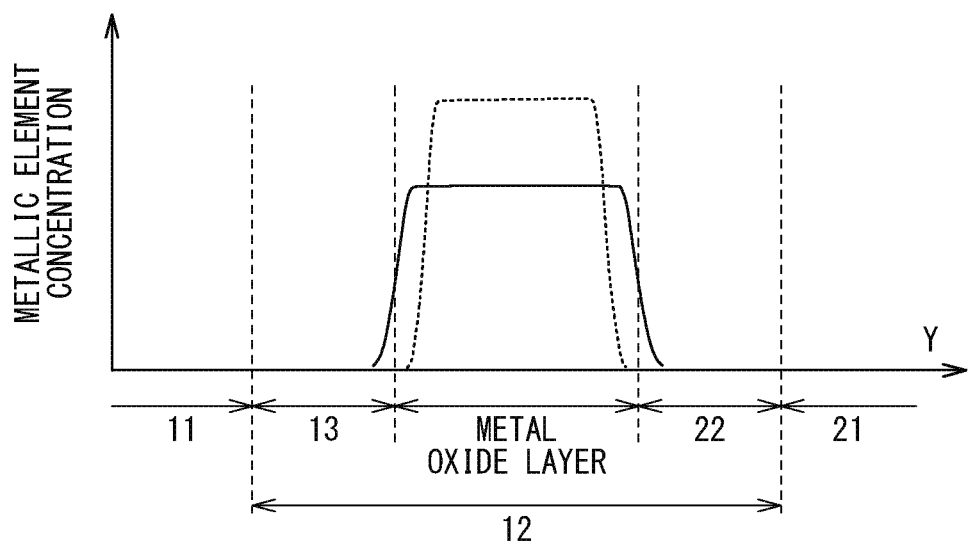

[ FIG. 6A ]
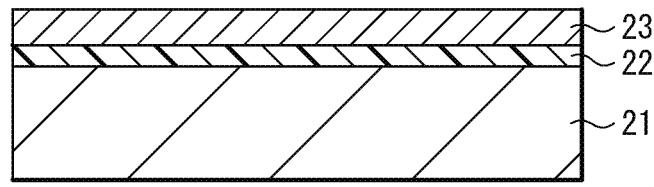
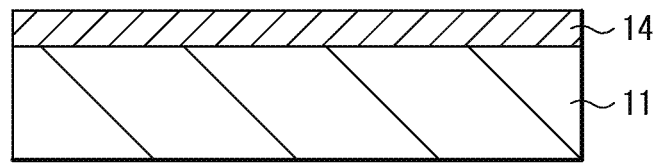
[ FIG. 6B ]
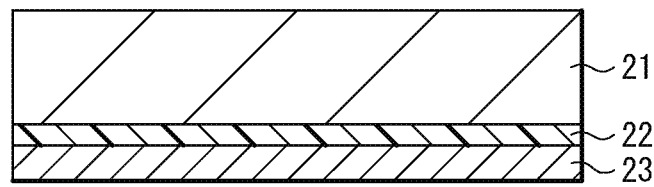
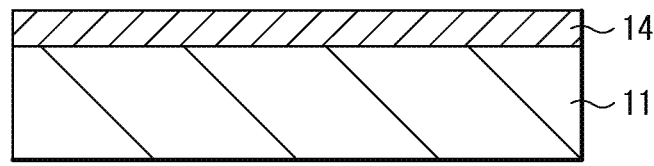
[ FIG. 6C ]
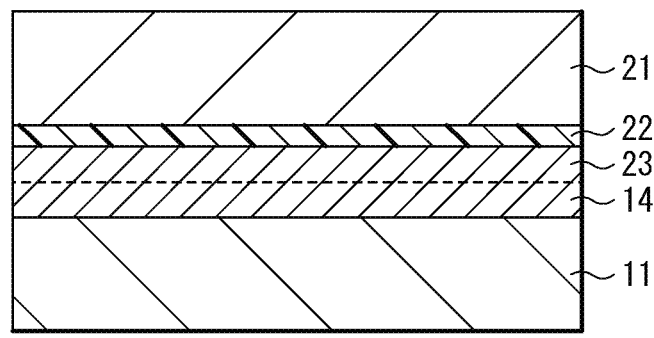

[ FIG. 7A ]
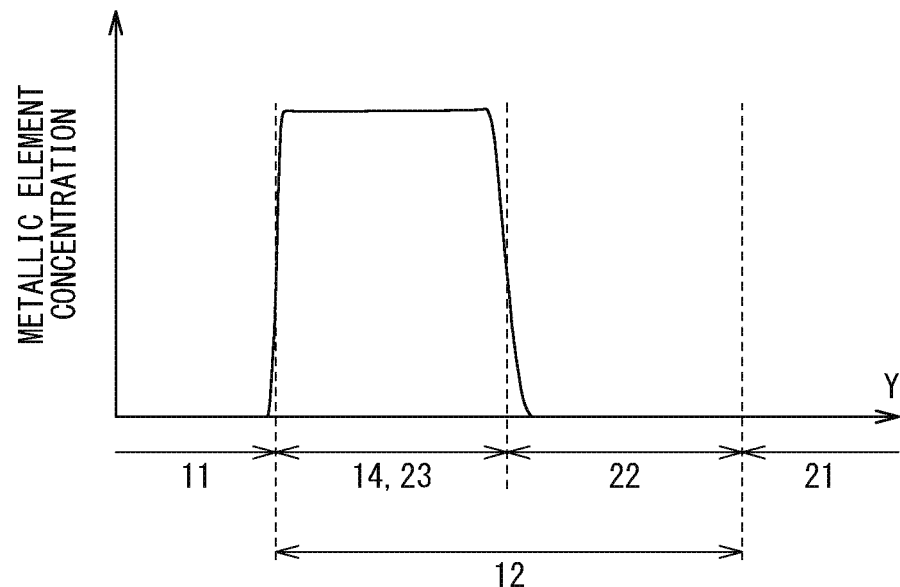
[ FIG. 7B ]
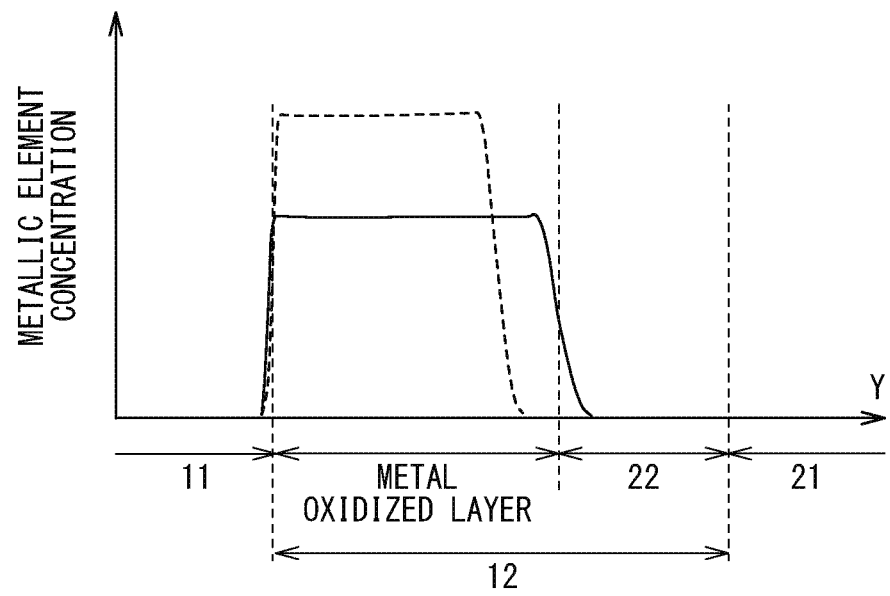

[ FIG. 8 ]
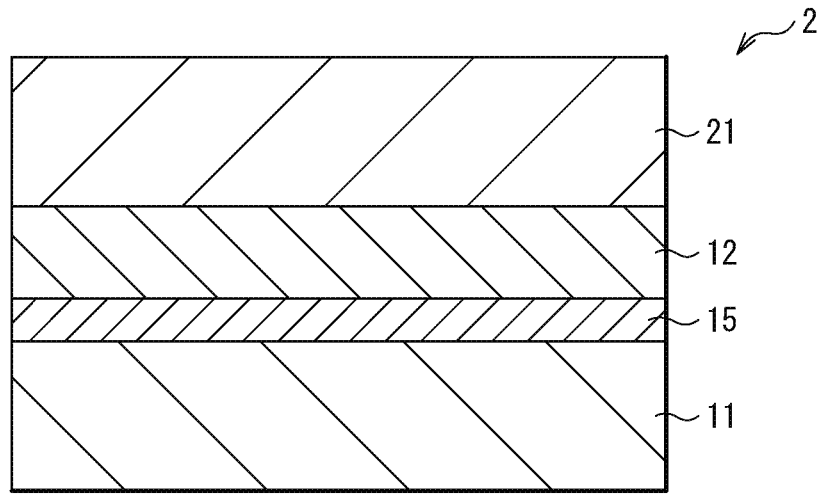
[ FIG. 9 ]
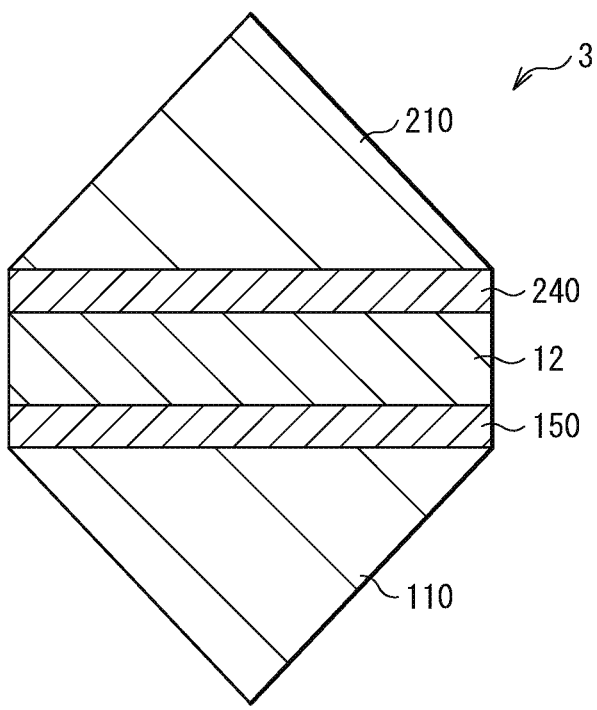

[ FIG. 10 ]
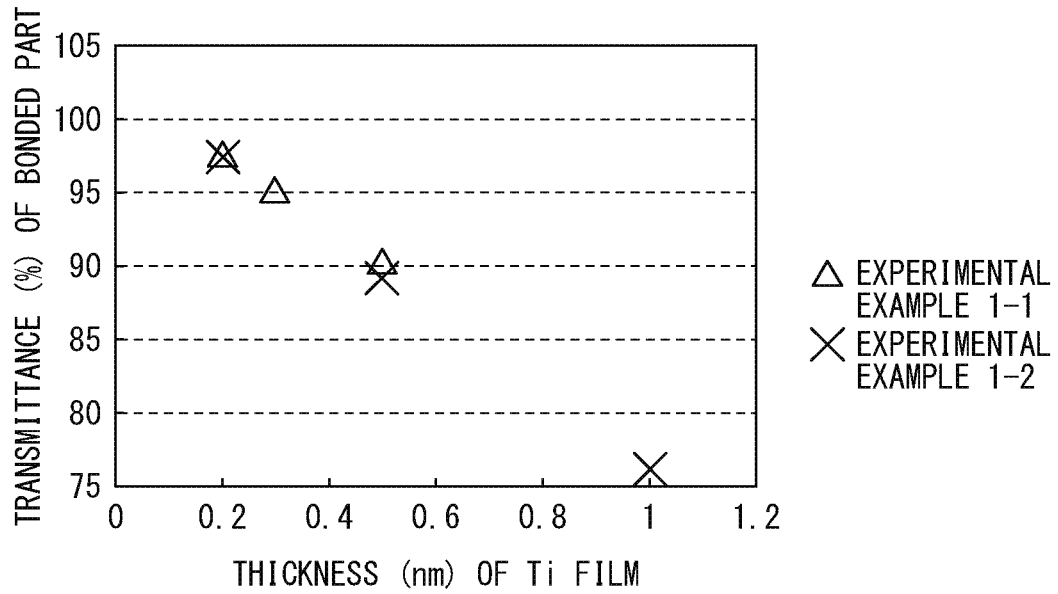
[ FIG. 11 ]
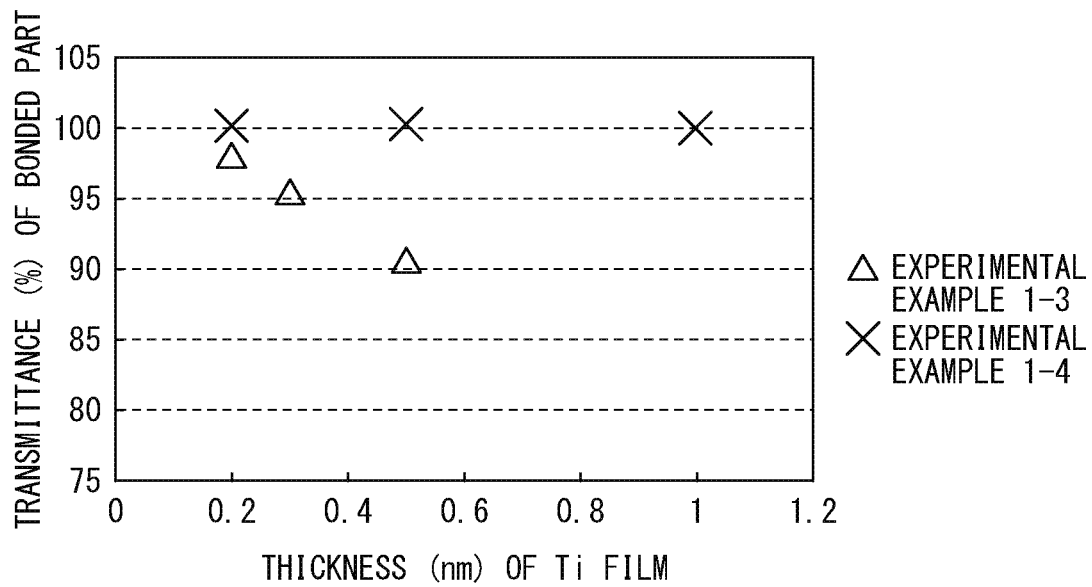

[ FIG. 12 ]
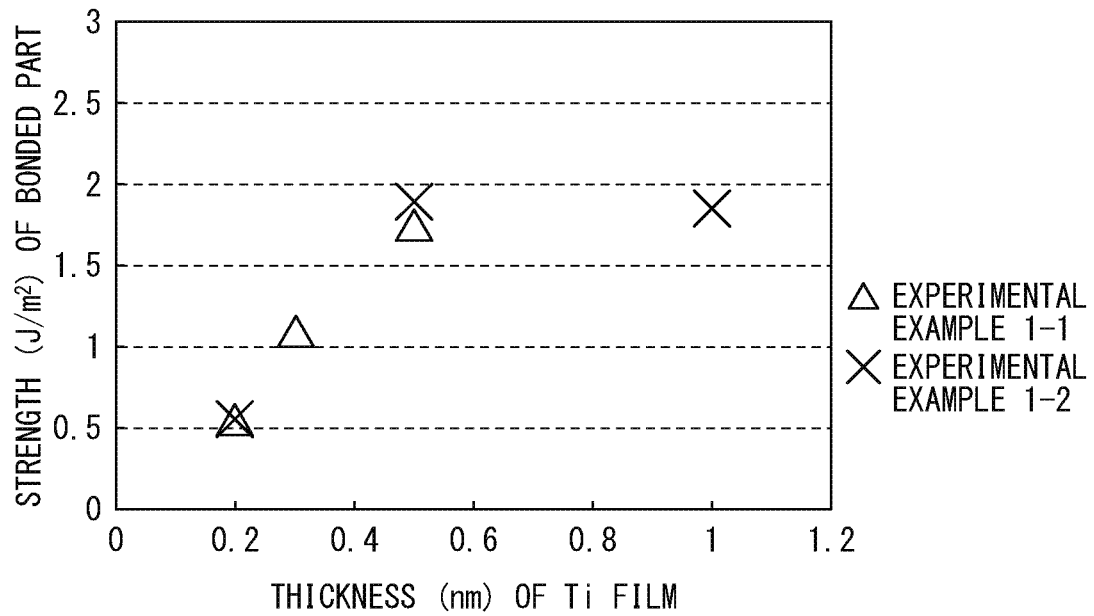
[ FIG. 13 ]
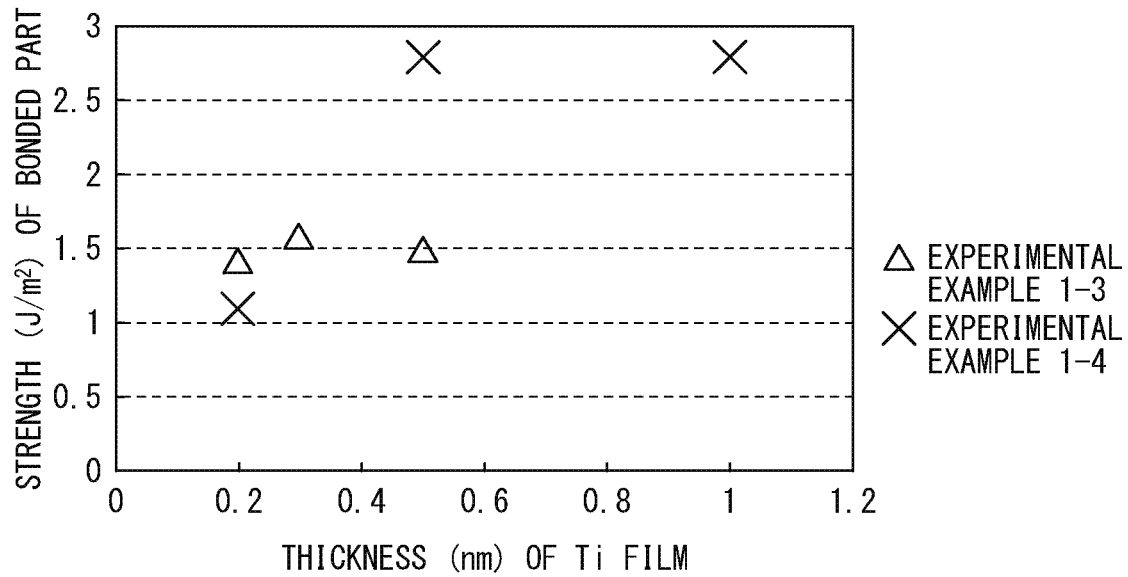

[FIG. 14]
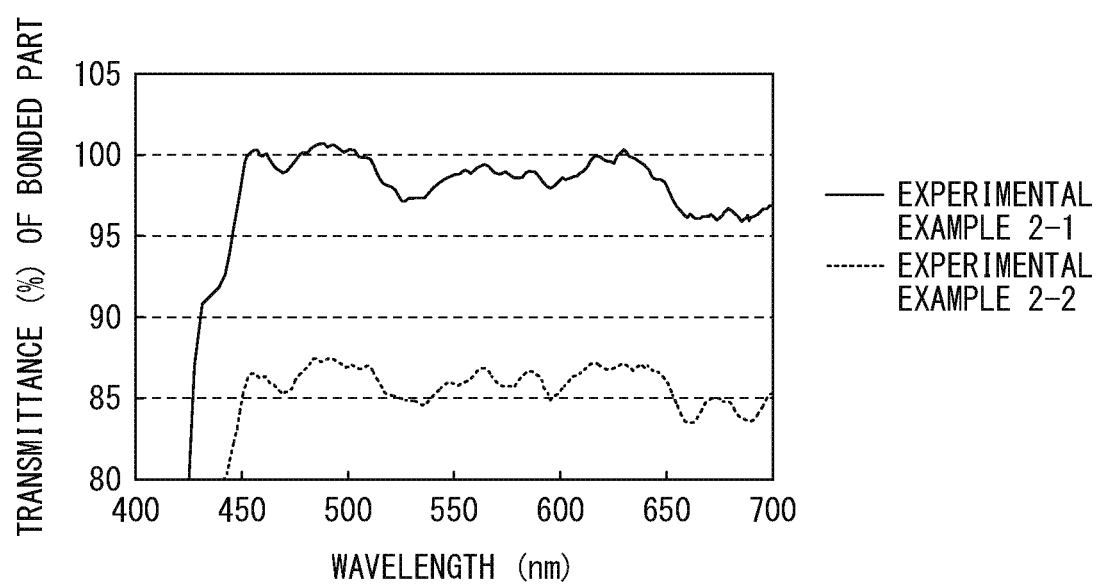

FUNCTIONAL ELEMENT AND METHOD OF MANUFACTURING FUNCTIONAL ELEMENT, AND ELECTRONIC APPARATUS

CROSS REFERENCE TO RELATED APPLICATIONS

This application is a U.S. National Phase of International Patent Application No. PCT/JP2018/047791 filed on Dec. 26, 2018, which claims priority benefit of Japanese Patent Application No. JP 2018-004115 filed in the Japan Patent Office on Jan. 15, 2018. Each of the above-referenced applications is hereby incorporated herein by reference in its entirety.

TECHNICAL FIELD

The present disclosure relates to a functional element including, for example, two or more light-transmissive substrates stuck together and a manufacturing method thereof, and an electronic apparatus including this.

BACKGROUND ART

In a case where light-transmissive substances are bonded, a method is generally used in which the substances are stuck together with an adhesive including acrylic polymer as a material and then the substances are bonded by being irradiated with ultraviolet light. However, a cured adhesive is known to change the nature thereof and deteriorate due to ultraviolet light, etc. To cope with this, for example, PTL 1 discloses a structure including two substances that are members to be bonded. The two substances are bonded with no adhesive by using an atomic diffusion bonding method.

CITATION LIST

Patent Literature

PTL 1: Japanese Unexamined Patent Application Publication No. 2010-46696

SUMMARY OF THE INVENTION

Incidentally, bonding of light-transmissive members to be bonded requires a high light transmission property of a bonded part in addition to resistance to deterioration of bonding between the members to be bonded.

It is desirable to provide a functional element, a method of manufacturing the functional element, and an electronic apparatus including this that make it possible to improve reliability.

A functional element according to an embodiment of the present disclosure includes: a first substrate; a second substrate disposed to face the first substrate; and a buffer layer provided between the first substrate and the second substrate. The buffer layer has, in a layer thereof, a distribution of concentration of a metallic element. The distribution changes in a film thickness direction.

A method of manufacturing a functional element according to an embodiment of the present disclosure includes bonding a first substrate and a second substrate, and forming a buffer layer between the first substrate and the second substrate. The buffer layer has, in a layer thereof, a distribution of concentration of a metallic element. The distribution changes in a film thickness direction.

An electronic apparatus according to an embodiment of the present disclosure includes the above-described functional element according to the embodiment of the present disclosure.

In the functional element according to the embodiment of the present disclosure and the method of manufacturing the functional element according to the embodiment, and the electronic apparatus according to the embodiment, the first substrate and the second substrate are bonded across the buffer layer having, in the layer thereof, the distribution of concentration of the metallic element. The distribution changes in the film thickness direction. This allows for bonding of the first substrate and the second substrate with no adhesive, and makes it possible to improve a light transmission property of a bonded part.

According to the functional element according to the embodiment of the present disclosure, the method of manufacturing the functional element according to the embodiment, and the electronic apparatus according to the embodiment, the first substrate and the second substrate are bonded across the buffer layer having, in the layer thereof, the distribution of concentration of the metallic element, and thus the bonded part including no adhesive and having a high light transmission property is formed. The distribution changes in the film thickness direction. Therefore, it is possible to provide the functional element having high reliability.

It is to be noted that the effects described here are not necessarily limited, but any of effects described in the present disclosure may be included.

BRIEF DESCRIPTION OF DRAWING

FIG. 1 is a schematic cross-sectional view of a configuration of a functional element according to an embodiment of the present disclosure.

FIG. 2 is a diagram illustrating an example of change in concentration of a metallic element in a buffer layer illustrated in FIG. 1.

FIG. 3 is a diagram illustrating another example of the change in the concentration of the metallic element in the buffer layer illustrated in FIG. 1.

FIG. 4A is a schematic cross-sectional view illustrating an example of a method of manufacturing the functional element illustrated in FIG. 1.

FIG. 4B is a schematic cross-sectional view illustrating a process subsequent to FIG. 4A.

FIG. 4C is a schematic cross-sectional view illustrating a process subsequent to FIG. 4B.

FIG. 5A is a characteristic diagram illustrating a distribution of concentration of a metallic element in each layer illustrated in FIG. 4C before annealing treatment.

FIG. 5B is a characteristic diagram illustrating a distribution of concentration of a metallic element in each layer illustrated in FIG. 4C after the annealing treatment.

FIG. 6A is a schematic cross-sectional view illustrating another example of the method of manufacturing the functional element illustrated in FIG. 1.

FIG. 6B is a schematic cross-sectional view illustrating a process subsequent to FIG. 6A.

FIG. 6C is a schematic cross-sectional view illustrating a process subsequent to FIG. 6B.

FIG. 7A is a characteristic diagram illustrating a distribution of concentration of a metallic element in each layer illustrated in FIG. 6C before annealing treatment.

FIG. 7B is a characteristic diagram illustrating a distribution of concentration of a metallic element in each layer illustrated in FIG. 6C before the annealing treatment.

FIG. 8 is a schematic cross-sectional view of a configuration of a functional element according to a modification example of the present disclosure.

FIG. 9 is a schematic cross-sectional view illustrating an example of an application example.

FIG. 10 is a characteristic diagram illustrating a relationship between a transmittance of a bonded part and thickness of a Ti film in each of Experimental Examples 1-1 and 1-2.

FIG. 11 is a characteristic diagram illustrating a relationship between a transmittance of a bonded part and thickness of a Ti film in each of Experimental Examples 1-3 and 1-4.

FIG. 12 is a characteristic diagram illustrating a relationship between strength of the bonded part and the thickness of the Ti film in each of Experimental Examples 1-1 and 1-2.

FIG. 13 is a characteristic diagram illustrating a relationship between strength of the bonded part and the thickness of the Ti film in each of Experimental Examples 1-3 and 1-3.

FIG. 14 is a diagram illustrating respective spectral characteristics in Experimental Examples 2-1 and 2-2.

MODES FOR CARRYING OUT THE INVENTION

The following describes embodiments of the present disclosure in detail with reference to the drawings. The following description is a specific example of the present disclosure, but the present disclosure is not limited to the following modes. In addition, the present disclosure does not limit the disposition, dimensions, dimension ratios, and the like of respective components illustrated in the diagrams thereto. It is to be noted that description is given in the following order.

1. Embodiment (An example of a functional element including, as a bonded part, a buffer layer having, in a layer thereof, a distribution of concentration of a metallic element that changes in a film thickness direction)
  1-1. Configuration of Functional Element
  1-2. Method of Manufacturing Functional Element
  1-3. Workings and Effects
2. Modification Example (An example of a functional element including a functional layer between substrates disposed to face each other)
3. Application Example
4. Working Examples

1. Embodiment

FIG. 1 illustrates a cross-sectional configuration of a functional element (a functional element 1) according to an embodiment of the present disclosure. This functional element 1 has a stacked structure in which two or more members to be bonded are stuck together, and is included in, for example, an optical element (see, for example, FIG. 9) used in a projector or the like. The functional element 1 according to the present embodiment has a configuration in which a substrate 11 (a first substrate) and a substrate 21 (a second substrate) are bonded across a buffer layer 12 having a distribution of concentration of a metallic element that changes in a stacking direction (a film thickness direction; for example, a Y-axis direction). The substrate 11 (the first substrate) and the substrate 21 (the second substrate) are members to be bonded.

1-1. Configuration of Functional Element

The substrate 11 and the substrate 21 do not particularly matter as long as the substrate 11 and the substrate 21 have a flat bonding surface; for example, the substrate 11 and the substrate 21 each include an inorganic material, a metallic material, a plastic material, or some other material. Examples of the inorganic material include silicon (Si), silicon oxide ($SiO_x$), silicon nitride ($SiN_x$), aluminum oxide ($AlO_x$), YAG (yttrium aluminum garnet), silicon carbide (SiC), diamond, and the like. Examples of silicon oxide include glass, spin-on-glass (SOG), or the like. Examples of the metallic material include aluminum (Al), nickel (Ni), stainless steel, or the like. Examples of the plastic material include polycarbonate (PC), polyethylene terephthalate (PET), polyethylene naphthalate (PEN), polyetheretherketone (PEEK), or the like. The substrate 11 and the substrate 21 may be a light-transmissive substrate, or may be a non-light-transmissive substrate. Examples of the light-transmissive one include a glass or quartz substrate, and the like.

It is preferable that the bonding surface of the substrate 11 and the substrate 21 has smoothness. Specifically, the bonding surface of the substrate 11 and the substrate 21 preferably has an arithmetic mean roughness (Ra) of, for example, 0.5 nm or less; however, for example, in a case of an inorganic material that is difficult to cause the bonding surface to be plastically deformed and adhere closely by application of pressure when bonded, the bonding surface of the substrate 11 and the substrate 21 only have to have an arithmetic mean roughness (Ra) of, for example, 1 nm or less.

The buffer layer 12 is a bonded part that bonds the substrate 11 and the substrate 21, and, as described above, has, in a layer thereof, the distribution of concentration of a metallic element that changes in the film thickness direction (the Y-axis direction). For example, the buffer layer 12 has a configuration in which oxygen supply layers (oxygen supply layers 13 and 22) each including an oxygen supply material are provided on both the substrate 11 side and the substrate 21 side across an oxide layer of a metallic material (a metal oxide layer). The metal oxide layer is formed, for example, by metal films 14 and 23 to be described later being oxidized by oxygen supplied from the oxygen supply layers 13 and 22. The above-described distribution of concentration of a metallic element is formed between the metal oxide layer and the oxygen supply layers 13 and 22.

FIG. 2 illustrates an example of a change in concentration of a metallic element in the buffer layer 12. In FIG. 2, the horizontal axis indicates a position in the film thickness direction in the buffer layer 12; for example, $Y_0$ denotes an interface with the substrate 11, and $Y_1$ denotes an interface with the substrate 21. The vertical axis indicates concentration of a metallic element in the buffer layer 12. For example, as illustrated in FIG. 2, the buffer layer 12 has a distribution of concentration that, for example, continuously decreases in a predetermined range from the inside of the buffer layer 12 toward the interfaces with the substrate 11 and the substrate 21.

Furthermore, the distribution of concentration of a metallic element in the buffer layer 12 is not limited to this. For example, although the details are described later, the buffer layer 12 may have the oxygen supply layer including the oxygen supply material formed only on the side of one of the substrates disposed to face each other (for example, on the substrate 21 side). In that case, in the buffer layer 12, a distribution of concentration that, for example, continuously decreases in a predetermined range, for example, from the substrate 11 side toward the substrate 21 is formed as illustrated in FIG. 3. The distributions of concentration of a metallic element in the buffer layer 12 illustrated in FIGS. 2 and 3 are formed in a later-described process of bonding the substrate 11 and the substrate 21.

Examples of metallic materials included in the buffer layer 12 include aluminum (Al), silicon (Si), titanium (Ti), vanadium (V), chromium (Cr), iron (Fe), cobalt (Co), nickel (Ni), copper (Cu), zinc (Zn), gallium (Ga), germanium (Ge), zirconium (Zr), niobium (Nb), molybdenum (Mo), ruthenium (Ru), rhodium (Rh), palladium (Pd), silver (Ag), indium (In), tin (Sn), hafnium (Hf), tantalum (Ta), and the like. The above-described metallic materials are metallic elements that each form the above-described distribution of concentration in the buffer layer 12, and are used as materials of the metal films 14 and 23 to be described later. That is, the metallic element that forms the distribution of concentration in the buffer layer 12 is derived from the metal films 14 and 23.

It is sufficient if the oxygen supply material included in the buffer layer 12 is a material that allows the metal films 14 and 23 to be oxidized after bonding of the metal film 14 and the metal film 23 to be described later. It is possible to use, for example, an inorganic material or a metallic material that is chemically bound to oxygen as such a material. Furthermore, it is possible to use a material that allows oxygen to be physically adsorbed and contained in voids formed by a grain boundary or the like in the oxygen supply layers 13 and 22. Either material is preferably, as the oxygen supply material, a material having a lower ability to bind oxygen than that of each of the metallic materials used as the metal films 14 and 23. Examples of the oxygen supply material include inorganic oxide (for example, $SiO_x$), metal oxide (for example, aluminum oxide ($Al_2O_3$)), inorganic nitride (for example, SiN), inorganic oxynitride (for example, SiON), inorganic fluoride (for example, $SiF_x$), and the like.

Here, the ability to bind oxygen is defined as follows. For example, the oxygen-binding ability of each of metallic materials included in the metal films 14 and 23 in a case where titanium (Ti) is used as the metallic materials included in the metal films 14 and 23 is an ability to chemically bind titanium atoms to oxygen atoms. Furthermore, the oxygen-binding ability of an oxygen supply material in a case where silicon oxide ($SiO_2$) is used as the oxygen supply material includes an ability to chemically bind silicon atoms to oxygen atoms and an ability to bind silicon oxide ($SiO_2$) to non-covalent, trapped oxygen. It is to be noted that the non-covalent, trapped oxygen includes oxygen trapped through water and oxygen trapped in a film.

It is to be noted that the metallic material and the oxygen supply material may be crystalline solids, or may be glassy solids (non-crystalline solids).

The buffer layer 12 preferably has, in a case where the functional element 1 is used as an optical element, for example, such as a polarization conversion element, in an optical device or some other device, a light transmission property, and preferably has, in a case where the functional element 1 is used in an electrical device, for example, such as MEMS, an electrical insulation property. In that case, it is preferable to use materials each having a high light transmission property or materials each having a high electrical insulation property as the metallic material and the oxygen supply material that are included in the buffer layer 12. In the present embodiment, a portion or all of the metallic materials included in the buffer layer 12 is, as described above, oxidized by oxygen or the like supplied from the oxygen supply layers 13 and 22, and becomes an oxide, and constitutes the metal oxide layer. This increases the light transmittance and the electrical insulation property of the buffer layer 12.

1-2. Method of Manufacturing Functional Element

It is possible to manufacture the functional element 1 like this in the following manner, for example.

First, as illustrated in FIG. 4A, the oxygen supply layer 13 (a first buffer layer) having a thickness of, for example, 2 nm or more and 20 μm or less is formed on the bonding surface of the substrate 11 using, for example, a vacuum deposition method that uses electron beams. It is to be noted that, in addition to the vacuum deposition method, an ion assisted deposition (Ion Assisted Deposition: IAD) method, a sputtering method, an ion plating method, a chemical vapor deposition (Chemical Vapor Deposition: CVD) method, and the like may be used to form the oxygen supply layer 13. Then, the metal film (a first metal film) 14 having a microcrystalline structure is formed on the oxygen supply layer 13.

The oxygen supply layer 13 includes the above-described oxygen supply material. As described above, it is preferable to form the oxygen supply layer 13 having a thickness of, for example, 2 nm or more and 20 μm or less; however, the thickness of the oxygen supply layer 13 is not limited to this. For example, if surface roughness of the oxygen supply layer 13 is reduced by, for example, mirror polishing, the oxygen supply layer 13 having a thickness of 20 μm or more may be formed.

The metal film 14 has a microcrystalline structure, and includes the above-described metallic material or a half-metallic material. The metal film 14 preferably has a thickness that allows the metallic material included in the metal film 14 to be sufficiently oxidized by oxygen generated from the oxygen supply layer 13, and, desirably, is sufficiently thinner than the oxygen supply layer 13. In the present embodiment, as described later, the substrate 11 and the substrate 21 are bonded with the metal film 14 and the metal film 23 superimposed using the atomic diffusion bonding method. At this time, if respective surfaces of the oxygen supply layers 13 and 22 are smooth, bonding is possible in spite of the metal films 14 and 23 each having the thickness of an ultrathin film, for example, 0.2 nm. Meanwhile, in a case where the oxygen supply layers 13 and 22 each have a high degree of surface roughness, or in a case where an oxidation reaction layer is formed at each of interfaces between the metal films 14 and 23 and the oxygen supply layers 13 and 22 when the metal films 14 and 23 are formed, it is necessary to make the metal films 14 and 23 thicker. However, bond strength increases with progress of the oxidation of the metal films. Furthermore, the thicknesses of the metal films 14 and 23 are important in imparting the light transmission property and the insulation property to the buffer layer 12. Therefore, it is preferable that the metal film 14 be thin and be, for example, 0.2 nm or more and 10 nm or less.

The metal film 14 is formed, for example, using the following method. First, for example, in a vacuum chamber with an ultimate vacuum of $1 \times 10^{-4}$ to $1 \times 10^{-8}$ Pa that is a high degree of vacuum, for example, a Ti film having a thickness of, for example, 0.2 nm or more and 10 nm or less is formed using, for example, a physical vapor deposition (Physical Vapor Deposition: PVD) method such as the sputtering method or the ion plating method, the CVD method, or any of various vapor deposition methods. It is to be noted that, in a case of using a metallic material having a relatively low diffusion rate, it is preferable to perform film formation using a vacuum film formation method or the sputtering method in which film formation is performed under generation of plasma that makes it possible to increase the internal stress of the formed metal film 14.

The pressure in the vacuum chamber when the metal film 14 is formed only has to be a vacuum atmosphere with an ultimate vacuum of $1\times10^{-4}$ to $1\times10^{-8}$ Pa; however, a lower pressure (a higher degree of vacuum) is more preferable. This makes it possible to use an easily-oxidizable material, for example, such as Al.

In a case where the metal film 14 is formed using the sputtering method, the pressure of inert gas (in general, argon (Ar) gas) at the time of film formation is preferably in a dischargeable region (for example, 0.01 Pa or more). However, there is a possibility that bonding at a pressure exceeding 30 Pa (300 μbar) may not be performed, and thus an upper limit is preferably set at 30 Pa (300 μbar) or less. This is because an increase in Ar gas pressure increases surface roughness of the metal film 14 to be formed.

Then, similarly to the above-described methods, the oxygen supply layer 22 and the metal film 23 are formed in this order on the substrate 21. The oxygen supply layer 22 and the metal film 23 include the above-described oxygen supply material and the above-described metallic material, respectively, as with the oxygen supply layer 13 and the metal film 14 described above.

It is to be noted that the oxygen supply layers 13 and 22 may be formed in different devices; however, it is desirable that the metal films 14 and 23 be formed and the metal film 14 and the metal film 23 be bonded as described later in the same device under a vacuum condition. This reduces oxidation of the surfaces of the metal films 14 and 23, and thus enables favorable bonding.

Then, as illustrated in FIG. 4B, the metal film 14 provided on the substrate 11 and the metal film 23 provided on the substrate 21 are disposed to face each other, and, as illustrated in FIG. 4C, the substrate 11 and the substrate 21 are bonded with the metal film 14 and the metal film 23 superimposed using, for example, the atomic diffusion bonding method. This causes atomic diffusion to occur at a bonding interface between the metal film 14 and the metal film 23 and a crystal grain boundary, and makes it possible to perform strain-relaxed bonding.

Finally, the bonded substrates 11 and 21 are left, as annealing treatment, under an environment of, for example, 100° C. or higher and 800° C. or less. This forms the buffer layer 12 having, in the layer thereof, a distribution of concentration of a metallic element between the substrate 11 and the substrate 21. As described above, the functional element 1 illustrated in FIG. 1 is completed.

It is to be noted that the annealing treatment may be performed under the same conditions as those of the formation of the metal films 14 and 23 and the bonding of the metal film 14 and the metal film 23, or may be performed, for example, in the atmosphere outside the device. Furthermore, 100° C. that is a temperature of the lower limit of the annealing treatment is an example of a temperature equal to or higher than an environmental temperature at which the functional element 1 is used. 800° C. that is a temperature of the upper limit of the annealing treatment is based on a softening point of optical glass and a melting point of light metal that are used in the substrates 11 and 21 and the oxygen supply layers 13 and 22 in a case where the functional element 1 is used as an optical element. Thus, the temperature of the annealing treatment is not limited to the above-described range; for example, in a case of forming a metal oxide film that is stable even in a range of environmental temperature at which the functional element 1 is used, treatment at 100° C. or lower is preferable. For example, in a case of bonding pieces of low-melting-point glass or the substrates 11 and 21 having thermal expansion coefficients, the annealing treatment is preferably performed under an environment of, for example, 300° C. or lower, and more preferably, for example, 100° C. or lower. For example, depending on a film formation process and a film formation material, leaving the metal films 14 and 23 at ordinary temperature enables oxidization. Furthermore, decreasing the density of the oxygen supply layers 13 and 22 to increase voids in the layer increases water to be physically adsorbed. This causes more oxygen to be supplied from the oxygen supply layer, accelerating the oxidation of the metal films 14 and 23 at ordinary temperature.

Moreover, the distribution of concentration of a metallic element in the layer of the buffer layer 12 is formed as follows. FIG. 5A illustrates a distribution of concentration of a metallic element in each layer illustrated in FIG. 4C before the annealing treatment. FIG. 5B illustrates a distribution of concentration of a metallic element in each layer illustrated in FIG. 4C after the annealing treatment. In the functional element 1 in which the metal film 14 and the metal film 23 are bonded using the atomic diffusion bonding method, oxygen is diffused from the oxygen supply layer 13 and the oxygen supply layer 22 to the metal film 14 and the metal film 23 by the annealing treatment, and the metallic materials included in the metal films 14 and 23 are oxidized, which forms a metal oxide layer. This forms a transparent bonding interface having an electrical insulation property between the substrate 11 and the substrate 21. At this time, in the metal films 14 and 23, metal atoms are oxidized, and this causes oxygen atoms to get in between the metal atoms. This increases the distance between the metal atoms, and decreases the density of the metallic element per unit volume. Thus, as illustrated in FIG. 5B, the width of the distribution of the metallic element is increased from the metal films 14 and 23 toward the oxygen supply layers 13 and 22. As described above, the concentration of the metallic element in the layer of the buffer layer 12 between the substrate 11 and the substrate 21 changes from FIGS. 5A and 5B, and a distribution of concentration of a metallic element that continuously decreases toward each of the interfaces with the substrate 11 and the substrate 21, for example, as illustrated in FIG. 2, is formed in the layer of the buffer layer 12.

It is to be noted that, in a case where the annealing treatment is performed at a higher temperature, interdiffusion between the metal oxide layer and the oxygen supply layers 13 and 22 is further accelerated; however, the metal atoms in the metal oxide are less likely to move, and thus a distribution of concentration of a metallic element is formed in the buffer layer 12.

Furthermore, the distribution of concentration of a metallic element in the buffer layer 12 is able to be observed by, for example, an energy dispersive X-ray analysis (Energy Dispersive X-ray analysis: EDX) method, an electron energy loss spectroscopy (Electron Energy Loss Spectroscopy: EELS) method, a secondary ion mass spectrometry (Secondary Ion Mass Spectrometry: SUMS) method, a TOF-SIMS analysis, and the like.

Furthermore, it is possible to manufacture the functional element 1 in the following manner, for example. In the above-described manufacturing method, there is given an example where the substrate 11 and the substrate 21 are both provided with the oxygen supply layers 13 and 22; however, only one of the substrates may be provided with an oxygen supply layer to bond the two substrates.

First, as illustrated in FIG. 6A, for example, the oxygen supply layer 22 is formed on the bonding surface of the substrate 21. Then, the metal film 23 having a microcrystalline structure is formed on the oxygen supply layer 22. On the bonding surface of the substrate 11, the metal film 14 is directly formed under a vacuum atmosphere.

Then, as illustrated in FIG. 6B, the surface of the substrate 21 on which the oxygen supply layer 22 and the metal film 23 are formed and the surface of the substrate 11 on which the metal film 14 is formed are disposed to face each other, and, as illustrated in FIG. 6C, the substrate 11 and the substrate 21 are bonded with the metal film 14 and the metal film 23 superimposed using, for example, the atomic diffusion bonding method.

Finally, the bonded substrates 11 and 21 are left, as annealing treatment, under an environment of, for example, 100° C. or higher and 800° C. or less. This forms the buffer layer 12 having, in the layer thereof, a distribution of concentration of a metallic element between the substrate 11 and the substrate 21. As described above, the functional element 1 illustrated in FIG. 1 is completed.

As described above, in a case where the oxygen supply layer is formed on only one of the substrates, the distribution of concentration of a metallic element in each layer changes before and after the annealing treatment as illustrated in FIG. 7A (before the annealing treatment) and FIG. 7B (after the annealing treatment), and a distribution of concentration of a metallic element that continuously decreases from the substrate 11 side toward the substrate 21, for example, as illustrated in FIG. 3, is formed in the layer of the buffer layer 12.

It is to be noted that the metal films 14 and 23 may be bonded using a method other than the above-described atomic diffusion bonding method. For example, in a case where a metal film is formed in advance on one or both of the surfaces of two substrates disposed to face each other, activating, in the vacuum chamber, a surface of the metal film formed in advance by, for example, plasma etching or the like make it possible to bond the metal film to the other metal film. Furthermore, as a process to accelerate the oxidation of the metal films 14 and 23, a laser or electromagnetic heating may be used, and the heating may be localized.

1-3. Workings and Effects

As described above, an adhesive including acrylic polymer as a material is generally used to bond light-transmissive substances. However, a cured adhesive is known to change the nature thereof and deteriorate due to ultraviolet light, etc. Especially, in a case where members to be bonded are used as optical components, for example, an adhesive is likely to deteriorate due to high-luminance light outputted from a light source section, and therefore a technique is desired to bond the members to be bonded with no adhesive.

As a method of bonding members to be bonded with no adhesive, for example, there are glass frit bonding and fusion bonding. However, in the glass fit bonding, the bond strength is low, and, in the fusion bonding, high-temperature heat treatment is performed; therefore, those are unfortunately difficult to achieve in industrial terms. By contrast, the atomic diffusion bonding method is a technique to form thin metallic microcrystal films on respective surfaces of two substrates to be bonded and bring the metallic microcrystal films into contact with each other, thereby bonding the two substrates at room temperature. At an interface between the metallic microcrystal films brought into contact with each other, atomic diffusion (atomic rearrangement) is caused to occur by large surface energy on the metal surface and a high atomic diffusion ability of the metallic microcrystal films, thereby bonding the substrates.

The atomic diffusion bonding method allows even a thin metal film of about a few Å to bond substrates each including any material at room temperature. Thus, it is possible to bond transparent substrates while maintaining the light transmission property thereof; however, the light transmission property is unfortunately reduced because of the metal film used for the bonding. Furthermore, in a case where the substrates are bonded with the thin metal film of about a few Å, it is possible to impart a certain electrical insulation property to a bonding interface, but electrical conductivity is slightly maintained unfortunately because of remaining metal.

In general, many metal oxides each have a high light transmission property and an insulation property. Therefore, if it is possible to oxidize the metal film used for the bonding after the bonding, it is possible to achieve a bonding interface having a high light transmission property and an insulation property.

To cope with this, in the present embodiment, an oxygen supply layer (for example, the oxygen supply layer 13) is formed on at least one of the substrate 11 or the substrate 21, and a metal film (the metal films 14 and 23) having a microcrystalline structure is formed on each of the substrates 11 and 21. The substrate 11 and the substrate 21 are bonded using the atomic diffusion bonding method, and then heated at low temperature (for example, 100° C. or higher and 800° C. or lower). The annealing treatment after the bonding thus moves oxygen from the oxygen supply layer to the metal film, and oxidizes the metal film. This increases the transparency of a bonding interface and eliminates electrical conductivity of the bonding interface. That is, it is possible to bond the substrate 11 and the substrate 21 with no adhesive, and also possible to increase the light transmission property and the electrical insulation property of a bonded part (the buffer layer 12). Furthermore, a distribution of concentration of a metallic element that changes in the film thickness direction is formed in the layer of the buffer layer 12 between the substrate 11 and the substrate 21.

As described above, in the present embodiment, the oxygen supply layer and the metal film having a microcrystalline structure are formed on at least one of the substrate 11 or the substrate 21. The substrate 11 and the substrate 21 are bonded using the atomic diffusion bonding method, and then heated at low temperature. This forms the buffer layer 12 between the substrate 11 and the substrate 21. The buffer layer 12 has the distribution of concentration of a metallic element that changes in the film thickness direction in the layer thereof and also has a high light transmission property and an electrical insulation property. That is, it is possible to form the bonded part that has high bond strength, high light transmission property, and electrical insulation property between the substrate 11 and the substrate 21 with no adhesive. Therefore, it is possible to provide the functional element 1 having high reliability.

Described below is a modification example of the above-described embodiment. In the following description, the same components to those of the above-described embodiment are denoted by the same reference signs, and description thereof is omitted as appropriate.

2. Modification Example

FIG. 8 illustrates a cross-sectional configuration of a functional element (a functional element 2) according to a modification example of the present disclosure. As with the above-described embodiment, this functional element 2 has a stacked structure in which two or more members to be bonded are stuck together, and is included in, for example, an optical element (see, for example, FIG. 9) used in a projector or the like. The functional element 2 according to the present modification example differs from the above-described embodiment in that the functional element 2 has a functional layer 15 between the substrate 11 and the buffer layer 12.

The functional layer 15 has optical functions of, for example, a polarization separation film that separates light incident on the functional element 2 into S-polarized light and P-polarized light, a dichroic filter that reflects light having a predetermined wavelength and transmits light having another wavelength, an antireflection film, a film that generates a phase difference, and the like. A plurality of functional layers 15 having different functions may be provided between the substrate 11 and the substrate 21, and, in that case, the functional layers 15 may be disposed between the substrate 21 and the buffer layer 12.

3. Application Example

Subsequently, an application example of the functional elements (the functional elements 1 and 2) described in the above-described embodiment and modification example is described. However, a configuration described below is merely an example, and the configuration is changeable as appropriate.

FIG. 9 schematically illustrates a cross-sectional configuration of an optical element (for example, a prism 3) as one of specific examples of the functional elements. The prism 3 has the shape of, for example, a triangular prism, and includes a functional layer 150, the buffer layer 12, and a functional layer 240 in this order from the substrate 110 side between a substrate 110 and a substrate 210 disposed to face each other. The substrate 110 and the substrate 210 each include, for example, transparent optical glass having the shape of a triangular pyramid. The functional layer 150 and the functional layer 240 are, for example, so-called polarization beam splitters that each enable separation and synthesis of S-polarized light and P-polarized light of light. The functional layer 150 and the functional layer 240 each have a configuration in which, for example, titanium oxide ($TiO_2$), silicon oxide ($SiO_2$), and aluminum oxide ($Al_2O_3$) are repeatedly stacked, in this order. For example, eleven $TiO_2$ films, ten $SiO_2$ films, and ten $Al_2O_3$ films are stacked. The buffer layer 12 includes titanium (Ti) as a metallic material. The buffer layer 12 further includes silicon oxide ($SiO_2$), and has a distribution of Ti concentration in a layer thereof. At least part of Ti included in the buffer layer 12 exists as titanium oxide ($TiO_2$).

It is to be noted that a $SiO_2$ film is generally formed using the ion assisted deposition (IAD) method or the vacuum deposition method; however, the $SiO_2$ film formed using the IAD method or the vacuum deposition method is low in flatness, and is used after being polished to have an arithmetic mean roughness (Ra) of about 0.5 nm. As described above, in a case where $SiO_2$ films are used as a functional layer (for example, the functional layer 150) and the buffer layer 12 and are formed using a method that allows for formation of the $SiO_2$ films having flatness corresponding to an arithmetic mean roughness (Ra) of about 0.5 nm, it is possible to use the $SiO_2$ film on an outermost surface of the functional layer 150 as an oxygen supply layer (for example, the oxygen supply layer 13).

Furthermore, the prism 3 is an example of the application example of the functional element according to the present disclosure, and is applicable to any electronic apparatus including two or more members to be bonded. The two or more members to be bonded are bonded with an adhesive. For example, the functional element and the manufacturing method thereof according to the present disclosure are applicable to an optical device of a projector, specifically, an optical element such as a phase difference element (a phase difference plate) or a polarization conversion element (a PS converter). In addition, the functional element and the manufacturing method thereof are applicable, for example, to a light source device. Examples of bonding in the light source device include bonding of a collimator lens of LD (a laser diode), bonding of nonlinear crystals such as YAG-YAG used in a high-output laser, bonding of a YAG-sapphire substrate for increasing cooling efficiency, bonding of a YAG ceramic phosphor onto a wheel substrate used in a projector, and so forth. Furthermore, the functional element and the manufacturing method thereof are also applicable to an electrical device. Examples of bonding in the electrical device include stacked TSV (Through Silicon Via) bonding in MEMS (Micro Electro Mechanical Systems), a 3D NAND-based memory, and a CMOS image sensor, stacked bonding in a SAW (a surface acoustic wave) filter, etc., and so forth.

4. Working Examples

Next, working examples of the present disclosure are described.

Experiment 1: Evaluation of Transmittance and Bond Strength of Bonded Part According to Thickness of Ti Film as Metal Film First, as Experimental Example 1-1, a sample was produced by forming a Ti film as a microcrystalline structure thin film (a metal film) on each of respective bonding surfaces of two pieces of quartz glass, and then bonding the metal films to each other. In addition, various samples of which the metal films differ in thickness were produced, and the transmittance and bond strength of a bonded part were measured. The respective transmittances of the bonded parts measured in this experiment each exhibited an average transmittance at a wavelength of 400 to 700 nm that is a visual light range.

In addition, Experimental Examples 1-2 to 1-4 were produced. As Experimental Example 1-2, various samples of which metal films differ in thickness were produced using a method similar to that of Experimental Example 1-1 described above, except that a $SiO_2$ film having a thickness of 5 μm was formed as an oxygen supply layer on each of respective bonding surfaces of two pieces of quartz glass, and a Ti film was formed as a metal film on this $SiO_2$ film. As Experimental Example 1-3, metal films were bonded to each other using a method similar to that of Experimental Example 1-1, and then subjected to annealing treatment at 300° C. for 10 hours. As Experimental Example 1-4, metal films were bonded to each other using a method similar to that of Experimental Example 1-2, and then subjected to annealing treatment at 300° C. for 10 hours. Table 1 summarizes compositions and annealing conditions of the respective samples produced as Experimental Examples 1-1 to 1-4.

TABLE 1

| | SUBSTRATE | OXYGEN SUPPLY LAYER | METAL FILM | ANNEALING CONDITIONS |
|---|---|---|---|---|
| EXPERIMENTAL EXAMPLE 1-1 | QUARTZ GLASS | — | Ti | — |
| EXPERIMENTAL EXAMPLE 1-2 | QUARTZ GLASS | $SiO_2$ | Ti | — |
| EXPERIMENTAL EXAMPLE 1-3 | QUARTZ GLASS | — | Ti | 300° C. 10 HOURS |
| EXPERIMENTAL EXAMPLE 1-4 | QUARTZ GLASS | $SiO_2$ | Ti | 300° C. 10 HOURS |

FIG. 10 illustrates a relationship between the transmittance of the bonded part and the thickness of the Ti film in each of Experimental Examples 1-1 and 1-2. FIG. 11 illustrates a relationship between the transmittance of the bonded part and the thickness of the Ti film in each of Experimental Examples 1-3 and 1-4. FIGS. 10 and 11 each plot the transmittance of the bonded part on the vertical axis and the thickness of the Ti film on the horizontal axis.

Results of FIG. 10 demonstrate that the transmittance of the bonded part decreases with an increase in the thickness of the Ti film. Furthermore, results of FIG. 11 demonstrate that the transmittance of the bonded part decreases with an increase in the thickness of the Ti film in Experimental Example 1-3 in which an oxygen supply layer was not formed as with Experimental Example 1-1, and the annealing treatment causes very little change in the transmittance. Meanwhile, in Experimental Example 1-4 in which the oxygen supply layer was formed on the quartz glass, the transmittance is almost 100% regardless of the thickness of the Ti film. That is, it is demonstrated that the transmittance of the bonded part is increased by forming the oxygen supply layer in an underlayer of the Ti film and performing the annealing treatment after the bonding.

FIG. 12 illustrates a relationship between the strength of the bonded part and the thickness of the Ti film in each of Experimental Examples 1-1 and 1-2. FIG. 13 illustrates a relationship between the strength of the bonded part and the thickness of the Ti film in each of Experimental Examples 1-3 and 1-4. FIGS. 12 and 13 each plot the strength of the bonded part on the vertical axis and the thickness of the Ti film on the horizontal axis. It is to be noted that the bond strength was found using a blade method.

Results of FIG. 12 demonstrate that the strength of the bonded part increases with an increase in the thickness of the Ti film. Furthermore, results of FIG. 13 demonstrate that Experimental Example 1-3 in which an oxygen supply layer was not formed offers almost the same results as those of Experimental Example 1-1, and a major change is not seen in the change in the bond strength caused by the annealing treatment. Meanwhile it is found that, in Experimental Example 1-4 in which the oxygen supply layer was formed on the quartz glass, the bond strength increases regardless of the thickness of the Ti film. That is, it is demonstrated that the bond strength is increased by forming the oxygen supply layer in an underlayer of the Ti film and performing the annealing treatment after the bonding.

As described above, the results of Experiment 1 demonstrate that, in the functional element according to the present disclosure, an oxygen supply layer is provided on each of members to be bonded, a metal film is formed on the oxygen supply layer, and annealing treatment is further performed after the members to be bonded are bonded, making it possible to form a bonded part (a buffer layer) that is able to achieve both high transmittance and high bond strength regardless of the thickness of the metal film having a microcrystalline structure.

Experiment 2: Evaluation of Transmittance of Bonded Part According to Each Wavelength First, as Experimental Example 2-1, two pieces of transparent optical glass (PBH56 available from OHARA INC.) were prepared, and a functional layer was formed on each of respective bonding surfaces. The functional layer had a configuration in which titanium oxide ($TiO_2$), silicon oxide ($SiO_2$), and aluminum oxide ($Al_2O_3$) were repeatedly stacked in this order, and eleven $TiO_2$ films, ten $SiO_2$ films, and ten $Al_2O_3$ films were stacked. Next, a sample was produced by forming a $SiO_2$ film having a thickness of 5 μm as an oxygen supply layer on each functional layer, then forming a Ti film of about 0.1 nm to 1.0 nm as a metal film on the $SiO_2$ film, and bonding the metal films to each other, and the spectral transmittance was measured.

In addition, as Experimental Example 2-2, a sample was produced by bonding that metal films to each other using a method similar to that of Experimental Example 2-1 described above, and then performing annealing treatment at 300° C. for 48 hours, and the spectral transmittance was measured. Table 2 summarizes compositions and annealing conditions of the respective samples produced as Experimental Examples 2-1 to 2-2.

TABLE 2

| | SUBSTRATE | FUNCTIONAL LAYER | OXYGEN SUPPLY LAYER | METAL FILM | ANNEALING CONDITIONS |
|---|---|---|---|---|---|
| EXPERIMENTAL EXAMPLE 2-1 | PBH56 GLASS | TiO (11 LAYERS) $SiO_2$ (10 LAYERS) $Al_2O_3$ (10 LAYERS) | $SiO_2$ | Ti | — |
| EXPERIMENTAL EXAMPLE 2-2 | PBH56 GLASS | TiO (11 LAYERS) $SiO_2$ (10 LAYERS) $Al_2O_3$ (10 LAYERS) | $SiO_2$ | Ti | 300° C. 48 HOURS |

It is to be noted that the functional layers produced in this experiment correspond to the functional layer 150 and the functional layer 240 of the prism 3 described in the above-described application example.

FIG. 14 illustrates the transmittance of the bonded part according to each wavelength as a result obtained by measuring the spectral transmittance in each of Experimental Example 2-1 and Experimental Example 2-2. FIG. 14 plots the transmittance of the bonded part on the vertical axis and the wavelength on the horizontal axis. The results of FIG. 14 demonstrate that, even though another layer (the functional layer) was formed between the member to be bonded and the buffer layer, the transmittance of the bonded part is increased by performing the annealing treatment after the bonding.

Although the present disclosure has been described above with reference to the embodiment, modification example, and working examples, the present disclosure is not limited to aspects described in the above-described embodiment and the like, and may be modified in a variety of ways. For example, not all the components described in the above-described embodiment and the like may necessarily be provided, and any other component may be further included. In addition, the material and the thickness of each of the above-described components are merely examples, but are not limited to those described herein.

Moreover, in the above-described embodiment and modification example, an example of bonding the two substrates 11 and 21 is provided; however, another substrate may further be bonded to the surface of the substrate 11 or the substrate 21 on the side opposite to the bonding surface using the method according to the present disclosure.

It is to be noted that the effects described herein are merely examples, but not limitative. In addition, there may be other effects.

It is to be noted that the present disclosure may have the following configurations.

(1)
A functional element including:
a first substrate;
a second substrate disposed to face the first substrate; and
a buffer layer provided between the first substrate and the second substrate, the buffer layer having, in a layer thereof, a distribution of concentration of a metallic element, the distribution changing in a film thickness direction.

(2)
The functional element according to (1), in which the buffer layer has, in the layer thereof, the distribution of the concentration of the metallic element, the distribution decreasing toward respective interfaces with the first substrate and the second substrate.

(3)
The functional element according to (1), in which the buffer layer has, in the layer thereof, the distribution of the concentration of the metallic element, the distribution decreasing from an interface with the first substrate toward an interface with the second substrate.

(4)
The functional element according to any of (1) to (3), in which the buffer layer has a light transmission property and an electrical insulation property.

(5)
The functional element according to any of (1) to (4), in which the buffer layer includes an oxygen supply material.

(6)
The functional element according to any of (1) to (5), in which the buffer layer includes at least any of inorganic oxide, inorganic nitride, inorganic oxynitride, or inorganic fluoride.

(7)
The functional element according to (6), in which the metallic element has a higher ability to bind oxygen than abilities of the inorganic oxide, the inorganic nitride, the inorganic oxynitride, and the inorganic fluoride.

(8)
The functional element according to any of (1) to (7), further including a functional layer at least between the first substrate and the buffer layer or between the second substrate and the buffer layer.

(9)
A method of manufacturing a functional element, the method including
bonding a first substrate and a second substrate, and forming a buffer layer between the first substrate and the second substrate, the buffer layer having, in a layer thereof, a distribution of concentration of a metallic element, the distribution changing in a film thickness direction.

(10)
The method of manufacturing the functional element according to (9), in which
a first metal film is formed on the first substrate, the first metal film having a first buffer layer and a microcrystalline structure, the first buffer layer including at least any of inorganic oxide, inorganic nitride, inorganic oxynitride, or inorganic fluoride,
a second metal film is formed on the second substrate, the second metal film having a second buffer layer and a microcrystalline structure, the second buffer layer including at least any of inorganic oxide, inorganic nitride, inorganic oxynitride, or inorganic fluoride, and
the buffer layer is formed by performing heat treatment after bonding the first metal film and the second metal film.

(11)
The method of manufacturing the functional element according to (10), in which the first metal film and the second metal film are formed and the first metal film and the second metal film are bonded under a vacuum condition.

(12)
The method of manufacturing the functional element according to (11), in which the first metal film and the second metal film are further formed and the first metal film and the second metal film are further bonded in a same device.

(13)
The method of manufacturing the functional element according to any of (10) to (12), in which the first metal film and the second metal film are oxidized by leaving the bonded first substrate and second substrate under an environment of 100° C. or higher and 800° C. or lower as the heat treatment.

(14)
The method of manufacturing the functional element according to (9) or any of (11) to (13), in which
a first metal film is formed on the first substrate, the first metal film having a first buffer layer and a microcrystalline structure, the first buffer layer including at least any of inorganic oxide, inorganic nitride, inorganic oxynitride, or inorganic fluoride,
a second metal film is formed on the second substrate, the second metal film having a microcrystalline structure, and
the buffer layer is formed by performing heat treatment after bonding the first metal film and the second metal film.

(15)
An electronic apparatus including
a functional element including
a first substrate,
a second substrate disposed to face the first substrate, and
a buffer layer provided between the first substrate and the second substrate, the buffer layer having, in a layer thereof, a distribution of concentration of a metallic element, the distribution changing in a film thickness direction.

This application claims the priority on the basis of Japanese Patent Application No. 2018-004115 filed on Jan. 15, 2018 with Japan Patent Office, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A method of manufacturing a functional element, the method comprising:
    forming a first metal film on a first substrate, wherein
        the first metal film includes a first buffer layer and a microcrystalline structure, and
        the first buffer layer includes at least one of inorganic oxide, inorganic nitride, inorganic oxynitride, or inorganic fluoride;
    forming a second metal film on a second substrate,
        wherein the second metal film includes a microcrystalline structure; and
    forming a buffer layer by performing heat treatment after bonding the first metal film and the second metal film, wherein
        the heat treatment includes leaving the first substrate and the second substrate under an environment of 100° C. or higher and 800° C. or lower, and
        the first metal film and the second metal film are oxidized based on the heat treatment.

2. The method of manufacturing the functional element according to claim 1, wherein the first metal film and the second metal film are formed, and the first metal film and the second metal film are bonded, under a vacuum condition.

3. The method of manufacturing the functional element according to claim 2, wherein the first metal film and the second metal film are formed, and the first metal film and the second metal film are bonded, in a same device.

4. The method of manufacturing the functional element according to claim 1, wherein a thickness of the second metal film is between 0.2 nm and 10 nm.

5. The method of manufacturing the functional element according to claim 4, wherein a thickness of the first buffer layer is between 2 nm and 20 μm.

6. The method of manufacturing the functional element according to claim 5, wherein a thickness of the first metal film is less than the thickness of the first buffer layer.

7. The method of manufacturing the functional element according to claim 1, wherein the buffer layer includes a metal oxide layer.

8. The method of manufacturing the functional element according to claim 1, wherein the buffer layer has, in a layer thereof, a distribution of concentration of a metallic element, and the distribution changes in a film thickness direction.

9. The method of manufacturing the functional element according to claim 8, wherein the distribution decreases toward respective interfaces with the first substrate and the second substrate.

10. The method of manufacturing the functional element according to claim 8, wherein the distribution decreases from an interface with the first substrate toward an interface with the second substrate.

11. The method of manufacturing the functional element according to claim 8, wherein the metallic element has a higher ability to bind oxygen than abilities of the inorganic oxide, the inorganic nitride, the inorganic oxynitride, and the inorganic fluoride.

12. The method of manufacturing the functional element according to claim 1, wherein the buffer layer is light transmissive and an electrical insulator.

13. The method of manufacturing the functional element according to claim 1, wherein each of the first substrate and the second substrate includes one of an inorganic material, a metallic material, or a plastic material.

14. The method of manufacturing the functional element according to claim 1, wherein each of the first substrate and the second substrate is light-transmissive.

15. The method of manufacturing the functional element according to claim 1, wherein each of the first substrate and the second substrate is non-light-transmissive.

16. The method of manufacturing the functional element according to claim 1, wherein
    the second metal film further includes a second buffer layer, and
    the second buffer layer includes at least one of inorganic oxide, inorganic nitride, inorganic oxynitride, or inorganic fluoride.

* * * * *